United States Patent Office 3,268,507
Patented August 23, 1966

3,268,507
WATER-INSOLUBLE MONOAZO DYESTUFFS
Winfried Kruckenberg, Leverkusen, Germany, assignor to Farbenfabriken Bayer Aktiengesellschaft, Leverkusen, Germany, a corporation of Germany
No Drawing. Filed Aug. 1, 1963, Ser. No. 299,692
Claims priority, application Germany, Aug. 10, 1962, F 37,563; Mar. 28, 1963, F 39,347
14 Claims. (Cl. 260—207)

The invention concerns new water-insoluble azo dyestuffs; more particularly it concerns new azo dyestuffs of the formula

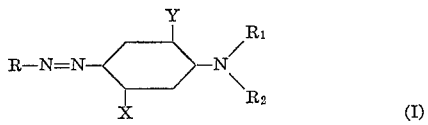

In this formula R stands for a residue of the benzene series, X stands for hydrogen, a lower alkyl, lower alkoxy, halogen or acylamino group; Y means hydrogen, halogen, a lower alkyl or lower alkoxy group; $R_2$ stands for a substituted or unsubstituted lower alkyl group, such as $-CH_3$, $-C_2H_5-$, $-C_3H_7$ (normal and iso), $-C_4H_9$ (normal and iso), $-C_2H_4CN$, β-carbo lower alkoxy ethyl or for a radical $R_1$; $R_1$ denotes a grouping

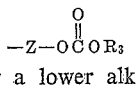

wherein Z stands for a lower alkyl group having 2–4 carbon atoms and $R_3$ means a substituted or unsubstituted lower alkyl radical, such as

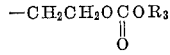

the dyestuffs of Formula I shall be free of sulfonic acid and carboxylic acid groups.

The present invention includes the following compounds:

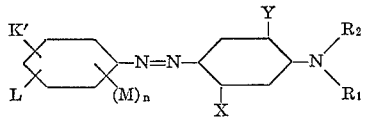

wherein K' is a member selected from the class consisting of cyano, bromo, chloro, nitro, lower alkyl, lower alkoxy, carbo lower alkoxy, trifluormethyl, phenyl, lower alkyl sulfonyl, phenyl sulfonyl, carbonamide and lower alkyl-substituted carbonamide; L is a member selected from the class consisting of hydrogen, cyano and nitro; M is a member selected from the group consisting of chloro and bromo, $n$ being an integer of 0–3 when M is chloro, and 0–1 when M is bromo; X is a member selected from the class consisting of $CH_3CO-NH-$, $C_2H_5CO-NH-$,

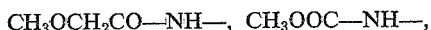
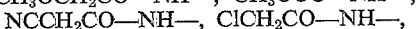
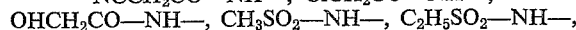
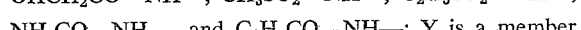

$NH_2CO-NH-$, and $C_6H_5CO-NH-$; Y is a member selected from the class consisting of hydrogen and lower alkoxy; $R_1$ is

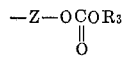

wherein Z is lower alkylene having 2–4 carbon atoms and $R_3$ is a member selected from the group consisting of lower alkyl and cyano lower alkyl; $R_2$ is a member selected from the group consisting of lower alkyl, cyano lower alkyl and

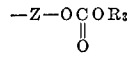

Of additional interest are those compounds having the formula:

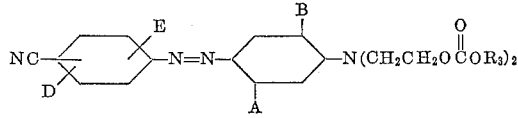

wherein D is a member selected from the class consisting of hydrogen, cyano, chloro and bromo; E is a member selected from the class consisting of hydrogen, chloro, and bromo; A is a member selected from the group consisting of hydrogen, methyl, and methoxy; and B stands for a member selected from the class consisting of hydrogen and methoxy; and $R_3$ is lower alkyl.

The novel water-insoluble azo dyestuffs are obtained by coupling a diazo component of the benzene series, in para position to the

group of a compound having the general formula

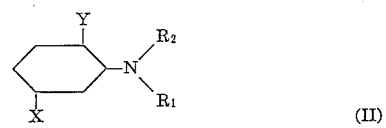

wherein X, Y, $R_1$ and $R_2$ have the above significance, and the starting materials free of sulfonic acid and carboxylic acid groups.

The coupling of the starting components proceeds in the usual manner, preferably in acid aqueous solution or suspension. As diazo components of the benzene series there may be employed with especial advantage those which contain one or more cyano groups. Suitable diazo components are, inter alia:

4-cyanoaniline,
4-nitro aniline,
4-nitro-2-chloroaniline,
4-nitro-2-cyanoaniline,
2,4-dicyanoaniline,
3-chloro-4-cyanoaniline,
2-cyano-5-chloroaniline,
3,4-dicyanoaniline,
2,5-dicyanoaniline,
2,6-dichloro-4-nitroaniline,
2-chloro-4-cyanoaniline,
4-aminophenyl-methylsulphone,
4-amino-acetophenone,
2-amino-5-nitrotoluene,
2-amino-5-nitroanisole,
3-nitro-4-amino-toluene,
2,4-dichloroaniline,
2,5-dichloro-4-nitroaniline,
2-trifluoromethyl-4-chloroaniline,
3-chloro-4-amino-1-trifluoromethyl-benzene,
2-cyano-4,5-6-trichloroaniline,
2,4-dinitro-6-bromoaniline,
2-cyano-4,6-dinitroaniline,
2-cyano-6-bromo-4-nitroaniline,
2-cyano-5-chloro-4-nitroaniline,
2,4-dicyano-6-chloroaniline,
2-methoxy-4-nitroanaline,
2-amino-5-nitro-benzoic-acid methyl ester,
3-nitro-4-aminobenzoic acid butylester,
4-aminobenzoic acid methyl ester,
4-amino-benzoic acid alkyl amides, such as -methyl or -dimethyl amide.

As coupling components the following amines can be used, for example:

1-N-β-cyanoethyl - N - β(ethoxycarbonyloxy)ethylamino-benzene of the formula

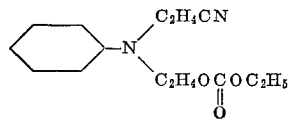

1-N-(β-carbomethoxyethyl)-N-(β-methoxycarbonyl-oxyethyl)-amino-3-methylbenzene,
1-N,N-di-(β-methoxycarbonyloxyethyl)-amino-3-methylbenzene,
N,N-di-β-(methoxycarbonyloxy)-ethylaminobenzene,
1-N,N-di-[β-(methoxy-carbonyloxy)-ethyl]-amino-3-acetylaminobenzene,

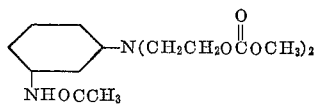

1-N-[β-(methoxy-carbonyloxy)-ethyl]-N-β-cyanoethyl-3-acetylaminobenzene,
1-N-[β-(methoxy-carbonyloxy)-ethyl]-N-β-carbo-methoxyethyl-3-acetylaminobenzene,
1-N,N-di-[β-(methoxy-carbonyloxy)-ethyl]-3-acetyl-amino-6-methoxybenzene,
1-N,N-di-[β-(methoxy-carbonyloxy)-ethyl]-3-ureido-6-ethoxybenzene,
1-N,N-di-[β-(methoxy-carbonyloxy)-ethyl]-3-acetyl-amino-6-methylbenzol,
1-N,N-di-[β-(methoxycarbonyloxy)-ethyl]-3-carbo-methoxyaminobenzene,
1-N-[β-(methoxycarbonyloxy)-ethyl]-N-ethyl-3-acetylaminobenzene,
1-N-[β-(isopropyloxycarbonyloxy)ethyl]-N-ethyl-3-carbomethoxyaminobenzene,
1-N-[β-(methoxy-carbonyloxy)-ethyl]-N-methyl-3-benzoylaminobenzene,
1-N,N-di-[β-(ethoxy-carbonyloxy)-ethyl]-3-methoxy-acetylaminobenzene,
1-N-[β-(methoxy-carbonyloxy)-ethyl]-N-propyl-3-oxyacetylaminobenzene,
1-N-ethyl-N-[β,γ-di-(methoxycarbonyloxy)-propyl]-3-acetylaminobenzene.

From the above list of the coupling components it will be understood that those dyestuffs are likewise within the scope of the invention which carry on the 2 to 4 carbon atoms-containing lower alkylene radical, i.e., Z, other substituents than the grouping

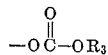

for instance a second

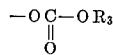

group. The other alkyl residues in the novel dyestuffs, e.g. the radicals $R_2$ and $R_3$ can, of course, likewise be further substituted and may be present as, e.g., halogeno-alky-, such as chloroethyl groups, cyanoalkyl-, such as cyanoethyl groups, or carbo lower alkoxy substituted alkyl groups, such as carbomethoxy- or carboethoxyethyl radicals. The list of coupling components further shows that a great variety of acylamino groups may be present in the azo component, among which lower aliphatic acyl groups and the non-ionic substitution products thereof, such as chloro- or alkoxy- or cyano-acetylamino groups, furthermore lower alkylsulfonyl- or arylsulfonylamino groups, such as methylsulfonyl-, ethylsulfonyl-, propylsulfonyl- and phenylsulfonylamino groups and the non-ionically substituted derivatives thereof, the urea grouping and the N-substitution products thereof, and carbo lower alkoxy amino (urethane) groups are of particular importance.

The coupling components (II) may be obtained by reacting, for instance, aniline which may bear the substituents X and Y, e.g., a mono acylated m-phenylenediamine, with ethyleneoxide according to common methods at about 130° C. whereupon the N,N-di-(hydroxyethyl)-derivative is obtained, and subsequently reacting the product in pyridine with a chloro formic acid alkyl-ester to yield the corresponding carbonate.

The novel azo dyestuffs may also be prepared according to a variation of the aforementioned process by forming the carbonate group(s) in the final step of the process; for this purpose diazo components of the indicated type are coupled with such coupling components of the Formula II which instead of

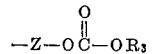

contain the corresponding —Z—OH group(s), and the hydroxyethylamino group-containing dyestuffs are finally reacted with, for instance, a chloro formic acid alkyl ester to form a carbonate group-containing dyestuff (I); the processes may be further varied in that an acylamino group X may be saponified and in a final step again acylated by means of other acylating agents.

The dyestuffs obtainable according to the invention are excellently suitable for dyeing and printing of hydrophobic materials, such as textiles or fibres of aromatic polyesters, e.g., polyethylene-terephthalates or condensation products of terephthalic acid and 1,4-(bis-hydroxymethyl)-cyclohexane. On these materials dyeings and printings of very good fastness properties, especially very good fastness to light, wet processing, such as to washing, and to sublimation and to thermofixing are obtained. The novel dyestuffs are further distinguished by very good drawing power onto the said polyester materials.

The dyestuffs are also suitable for dyeing and printing cellulose acetate (2½ acetate) and triacetyl cellulose, and fibre materials of synthetic superpolyamides and polyacrylonitrile. The dyestuffs are further distinguished by good crystallizability.

The following examples are given for the purpose of illustrating the invention without, however, limiting it thereto.

*Example 1*

16.3 parts by weight of 2-cyano-4-nitroaniline are dissolved in 400 parts by weight of concentrated sulphuric acid at 0–15° C. and diazotized with 170 parts by volume of nitrosyl sulphuric acid (42 g. of nitrite in 100 ml. of $H_2SO_4$) with good stirring and cooling, and poured into about 3000 parts by weight of ice after about 3 hours. A small excess of nitrite is removed with amidosulphonic acid and the solution is filtered. This solution is then combined with a solution of 29.7 parts by weight of the amino compound of the formula

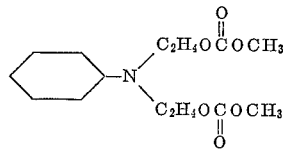

partly neutralised with dilute caustic soda and the coupling completed with sodium acetate. The dyestuff is filtered and washed. It forms in the dry state a black-red powder, which dissolves in organic solvent, such as acetone or alcohol, with a red colour. When finely dispersed by means of suitable additives, it dyes acetate rayon and synthetic super polyamide fabrics in clear red shades of good washing and light fastness.

In the same way, from the corresponding starting materials, the following dyestuffs can be produced, which dye fabrics of aromatic polyesters, such as polyethylene terephthalates, in the specified shades

| | |
|---|---|
| 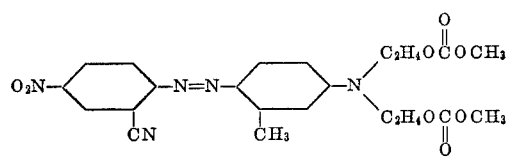 | Ruby. |
| 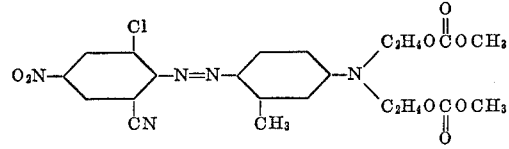 | Red-violet. |
| 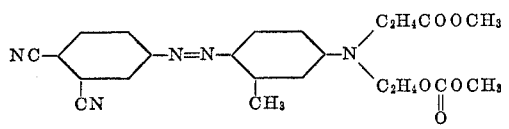 | Orange. |
| 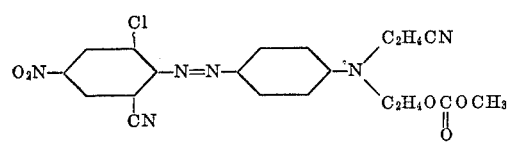 | Red-violet. |
| 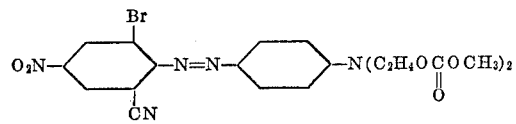 | Violet. |
| 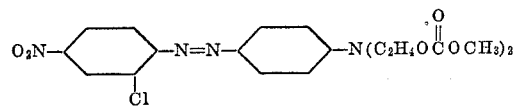 | Reddish orange. |
| 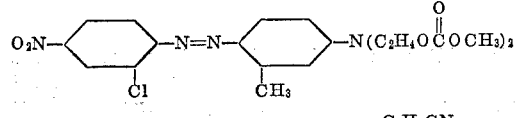 | Red. |
| 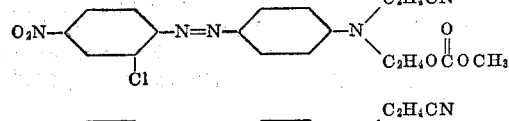 | Reddish orange. |
| 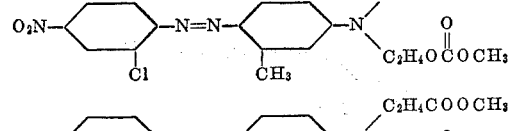 | Yellowish red. |
| 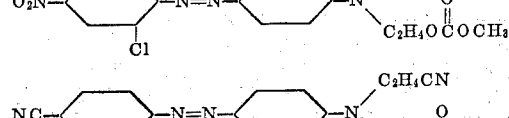 | Do. |
| 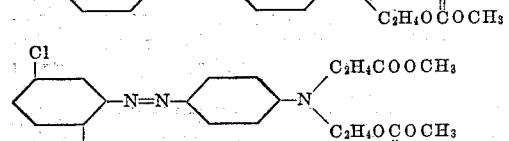 | Reddish yellow. |
| 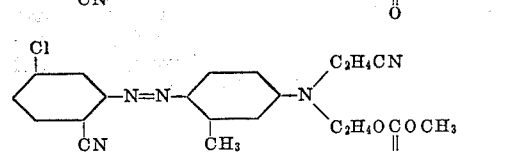 | Yellowish orange. |
| 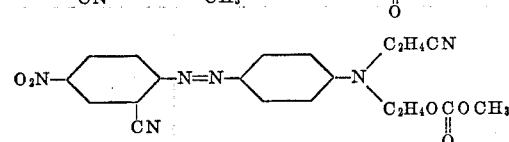 | Strongly yellowish orange. |
| 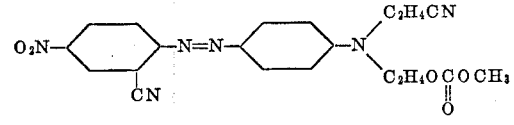 | Red. |

| Structure | Shade |
|---|---|
| O₂N–⟨C₆H₃(Cl)(CN)⟩–N=N–⟨C₆H₄⟩–(C₂H₄OCOCH₃)₂ | Bordeaux. |
| O₂N–⟨C₆H₄⟩–N=N–⟨C₆H₃(CH₃)⟩–N(C₂H₄OCOCH₃)₂ | Reddish orange. |
| NC–⟨C₆H₃(CN)⟩–N=N–⟨C₆H₄⟩–N(C₂H₄OCOCH₃)₂ | Do. |
| NC–⟨C₆H₃(Cl)(CN)⟩–N=N–⟨C₆H₃(CH₃)⟩–N(C₂H₄OCOCH₃)₂ | Red. |
| NC–⟨C₆H₃(Cl)(Cl)⟩–N=N–⟨C₆H₄⟩–N(C₂H₄CN)(C₂H₄OCOCH₃) | Strongly yellowish orange. |
| NC–⟨C₆H₃(Cl)(Cl)⟩–N=N–⟨C₆H₄⟩–N(C₂H₄OCOCH₃)₂ | Yellowish orange. |
| O₂N–⟨C₆H₄⟩–N=N–⟨C₆H₄⟩–N(C₂H₄OCOCH₃) | Reddish orange. |

The coupling component N,N-di-(β-methoxycarbonyloxy-ethyl)-aminobenzene used in some of the above examples was prepared in the following manner:

181 parts by weight of N,N-di-(hydroxyethyl)aniline are dissolved in 600 ml. of pyridine and 330 parts by weight of chloro formic acid methyl ester added dropwise at 10 to 20° C. The pyridine-chlorohydrate of the reaction product thus obtained is filtered with suction, the pyridine distilled off and the resulting substance washed with cold water. According to chromatogram analysis the product is obtained in pure form.

In equal manner other aromatic amines of the general formula

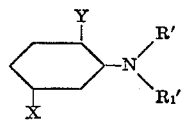

wherein X and Y have the above meaning and at least one of the radicals R' and R'₁ represent a hydroxyalkyl group can be used as starting materials in the above reaction for preparing the coupling components.

*Example 2*

16.3 parts by weight of 2-cyano-4-nitroaniline are dissolved at 0–15° C. in 400 parts by weight of concentrated sulphuric acid and the amino compound then diazotized by means of 170 parts by volume of nitrosyl sulphuric acid (42 parts by weight of sodium nitrite in 100 ml. of sulphuric acid) with good stirring and cooling; after a reaction time of 3 hours the mixture is poured onto about 3000 parts by weight of ice. A slight excess of nitrite is destroyed by means of amido-sulphonic acid and the solution then filtered. The solution of the diazonium compound thus prepared is combined with an aqueous solution of 34.4 parts by weight of the amino compound of the formula

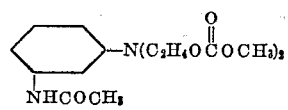

it is then partially neutralized with dilute soda lye and the coupling completed while adding sodium acetate. The dyestuff obtained is filtered and washed. When dry it represents a black-red powder which dissolves in organic solvents, such as alcohol or acetone, with red-violet coloration. The dyestuff dyes fibres of aromatic polyesters, such as of polyethylene terephthalate in finely dispersed form clear red-violet shades having good fastness to washing and to light.

In a similar manner the dyestuffs listed in the following table are obtainable from the corresponding starting materials; they yield on polyethyleneterephthalates and on fibres of aromatic polyesters produced from terephthalic acid and 1,4-bis-hydroxymethyl-cyclohexane fast dyeings having the below-indicated shades.

| Structure | Shade |
|---|---|
| 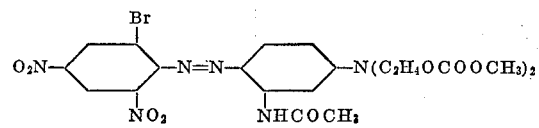 | Violet. |

| | |
|---|---|
| 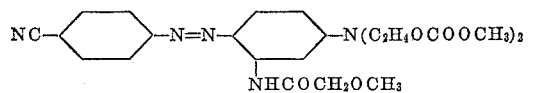 | Yellowish orange. |
| 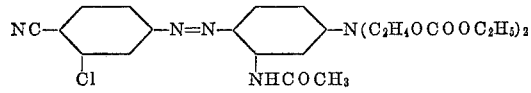 | Orange. |
| 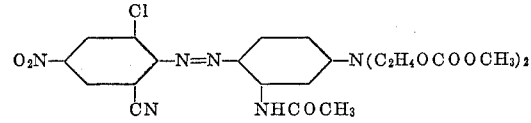 | Bluish violet. |
| 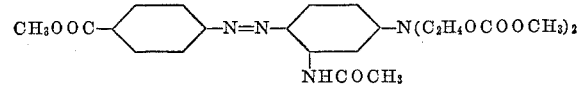 | Yellowish orange. |
| 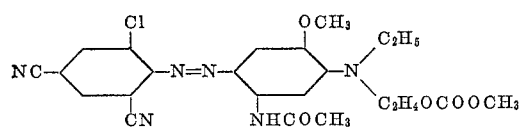 | Blue. |
| 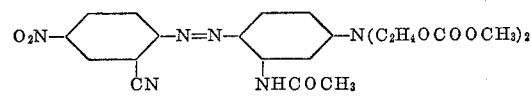 | Bluish ruby. |
| 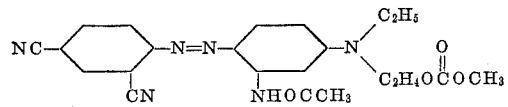 | Bluish red. |
| 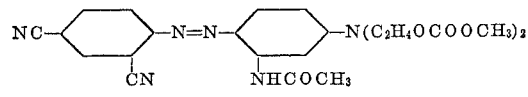 | Red. |
| 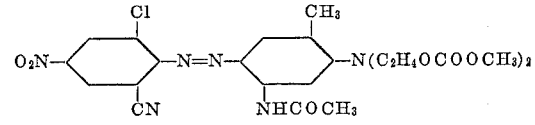 | Blue. |
| 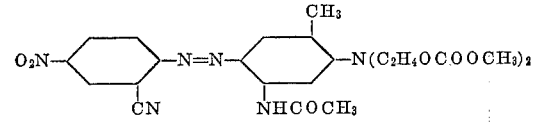 | Bluish ruby. |
| 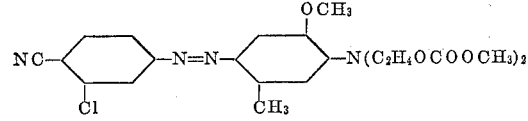 | Yellow-brown. |
| 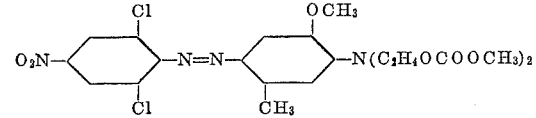 | Brown. |
| 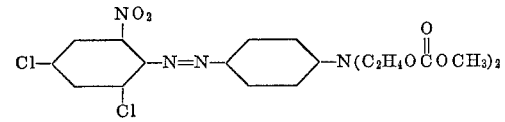 | Orange. |
| 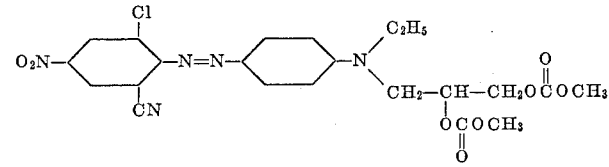 | Violet. |

| | |
|---|---|
| 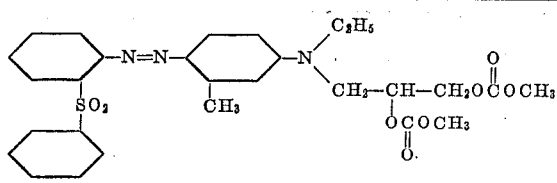 | Orange. |
| 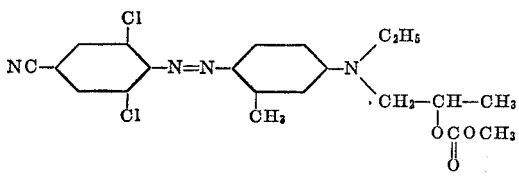 | Do. |
| 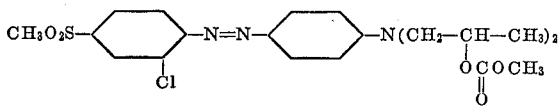 | Do. |
| 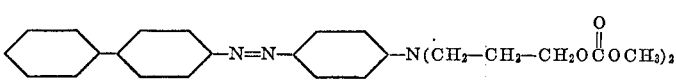 | Do. |
| 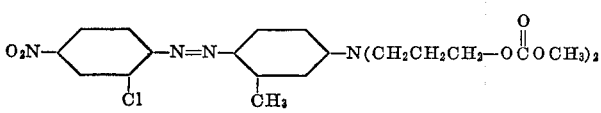 | Red. |
| 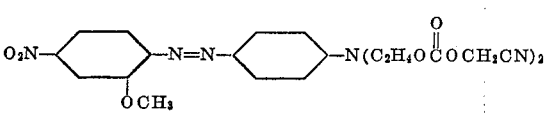 | Red. |
| 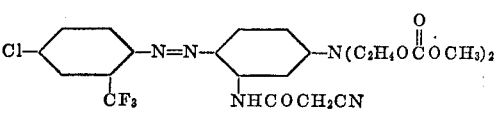 | Red. |
| 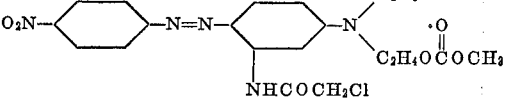 | Red. |
| 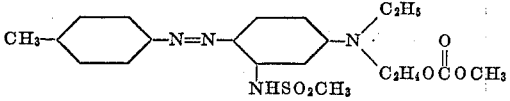 | Orange. |
| 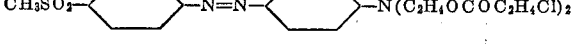 | Do. |
| 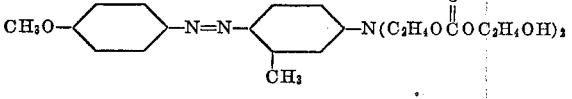 | Do. |
| 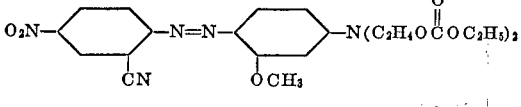 | Bluish red. |
| 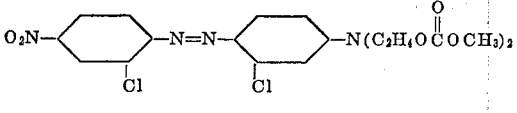 | Red. |
| 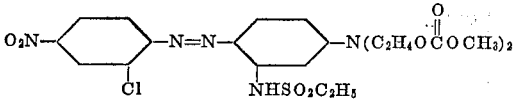 | Bluish red. |
| 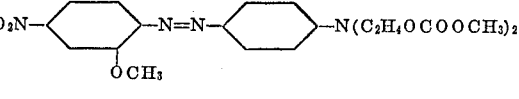 | Red. |

| Structure | Color |
|---|---|
| 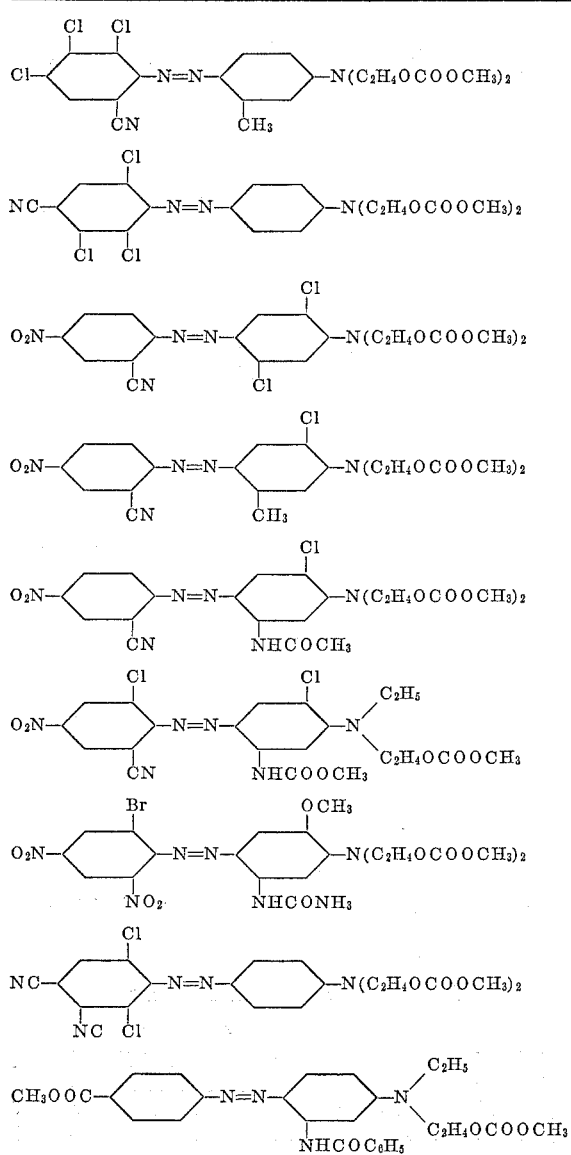 | Red. |
| | Red. |
| | Bluish red. |
| | Do. |
| | Violet. |
| | Reddish blue. |
| | Navy-blue. |
| | Red. |
| | Orange. |

*Example 3*

4 parts by weight of the first-mentioned dyestuff in Example 2 are finely dispersed with the aid of 4 parts by weight of an emulsifying polyglycolether and made up to a dye-bath of 8 l. of water which additionally contains 16 parts by weight of a carrier, e.g. benzoic acid, and 20 parts by weight of diammonium phosphate; 250 parts by weight of polyethyleneterephthalate fibres are introduced into this dye-bath at 50° C. and the temperature of the bath raised to the boil within 30 minutes. The dyeing is then continued at boiling temperature for further 1½ to 2 hours. The dyed fibres are subsequently washed alkaline at 70° C. for 20 minutes, rinsed and dried. A clear red-violet dyeing is thus obtained which exhibits good light and wet fastness properties and which is further distinguished by good thermofixing properties.

I claim:

1. A compound free of sulfonic and carboxylic acid groups and having the formula

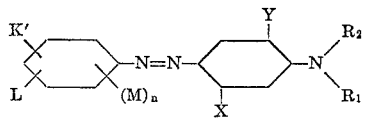

wherein K' is a member selected from the class consisting of cyano, bromo, chloro, nitro, lower alkyl, lower alkoxy, carbo lower alkoxy, trifluoromethyl, phenyl, lower alkyl sulfonyl, phenyl sulfonyl, carbonamide and lower alkyl-substituted carbonamide; L is a member selected from the class consisting of hydrogen, cyano and nitro; M is a member selected from the group consisting of chloro and bromo, $n$ being an integer of 0–3 when M is chloro, and 0–1 when M is bromo; X is a member selected from the class consisting of CH$_3$CO—NH—, C$_2$H$_5$CO—NH—
CH$_3$OCH$_2$CO—NH—, CH$_3$OOC—NH—
NCCH$_2$CO—NH—, ClCH$_2$CO—NH—
OHCH$_2$CO—NH—, CH$_3$SO$_2$—NH—
C$_2$H$_5$SO$_2$—NH—, NH$_2$CO—NH— and

C$_6$H$_5$CO—NH—

Y is a member selected from the class consisting of hydrogen and lower alkoxy; R$_1$ is

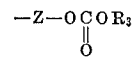

wherein Z is lower alkylene having 2–4 carbon atoms and R$_3$ is a member selected from the group consisting of lower alkyl and cyano lower alkyl; R$_2$ is a member selected from the group consisting of lower alkyl, cyano lower alkyl and

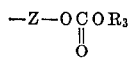

2. An azo dyestuff free of sulfonic and carboxylic acid groups and having the formula

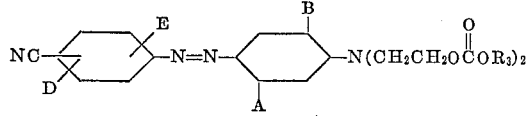

wherein D is a member selected from the class consisting of hydrogen, cyano, chloro and bromo; E is a member selected from the class consisting of hydrogen, chloro, and bromo; A is a member selected from the group consisting of hydrogen, methyl, and methoxy; and B stands for a member selected from the class consisting of hydrogen and methoxy; and $R_3$ is lower alkyl.

3. The dyestuff of the formula

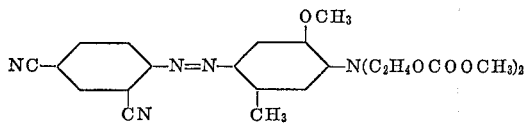

4. The dyestuff of the formula

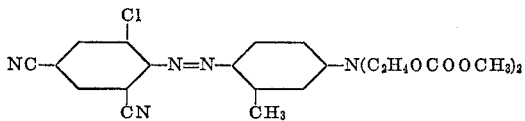

5. The dyestuff of the formula

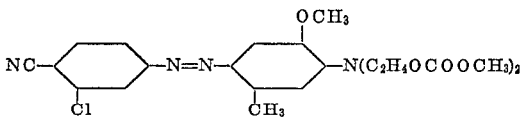

6. The dyestuff of the formula

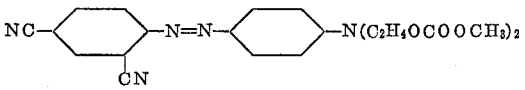

7. The dyestuff of the formula

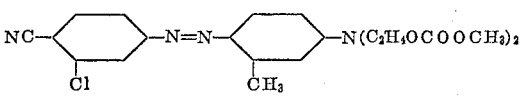

8. The dyestuff of the formula

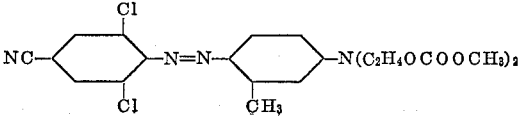

9. The dyestuff of the formula

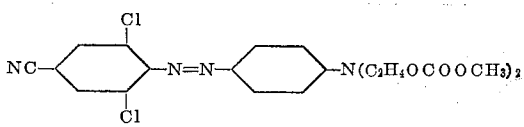

10. The dyestuff of the formula

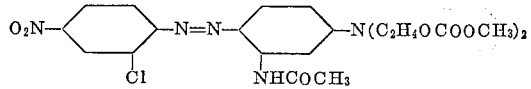

11. The dyestuff of the formula

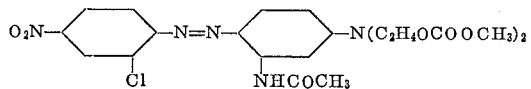

12. The dyestuff of the formula

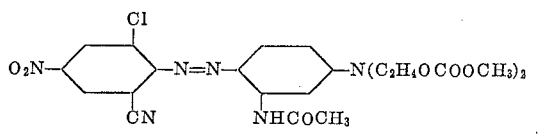

13. The dyestuff of the formula

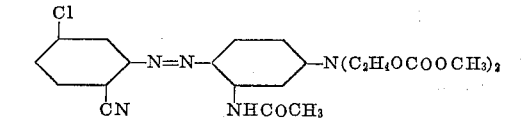

14. The dyestuff of the formula

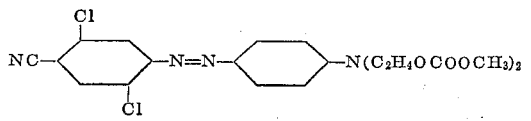

References Cited by the Examiner

UNITED STATES PATENTS

| | | | |
|---|---|---|---|
| 2,249,749 | 7/1941 | Dickey et al. | 260—207.1 X |
| 2,283,327 | 5/1942 | Felix et al. | 260—207.1 |
| 2,888,450 | 5/1959 | Kruckenberg | 260—207.1 X |
| 2,971,953 | 2/1961 | Rhyner | 260—207.1 |

FOREIGN PATENTS 856,348  12/1960  Great Britain.

CHARLES B. PARKER, *Primary Examiner.*
R. J. FINNEGAN, D. M. PAPUGA,
*Assistant Examiners.*